Figure 1:
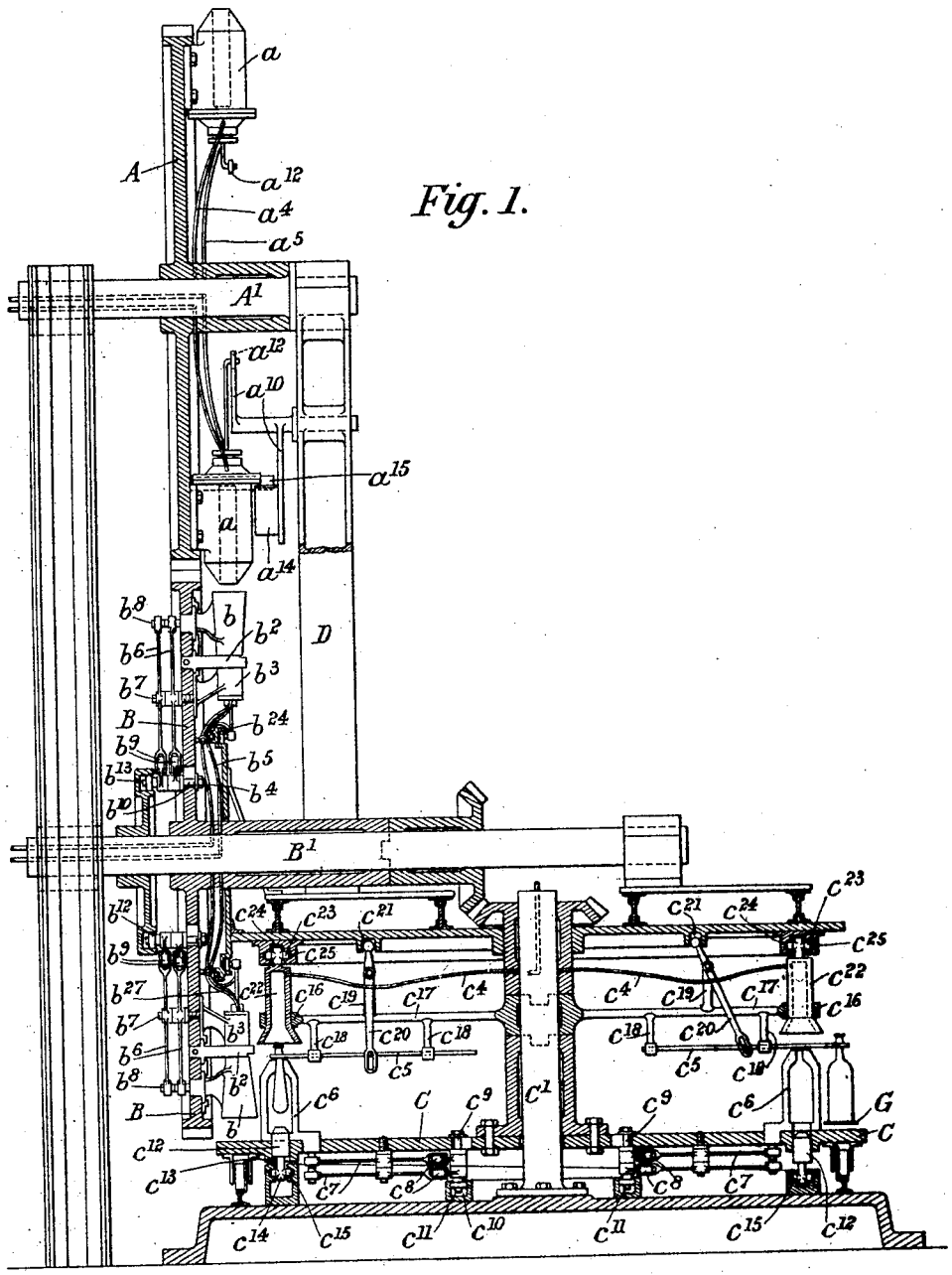

A. FERGUSON.
APPARATUS TO BE EMPLOYED IN THE MANUFACTURE OF HOLLOW ARTICLES OF GLASS.
APPLICATION FILED SEPT. 7, 1920.

1,371,085.

Patented Mar. 8, 1921.

A. FERGUSON.
APPARATUS TO BE EMPLOYED IN THE MANUFACTURE OF HOLLOW ARTICLES OF GLASS.
APPLICATION FILED SEPT. 7, 1920.

1,371,085.

Patented Mar. 8, 1921.

5 SHEETS—SHEET 3.

INVENTOR
Alexander Ferguson
by Howson and Howson
Attys.

A. FERGUSON.
APPARATUS TO BE EMPLOYED IN THE MANUFACTURE OF HOLLOW ARTICLES OF GLASS.
APPLICATION FILED SEPT. 7, 1920.
1,371,085.
Patented Mar. 8, 1921.
5 SHEETS—SHEET 4.
Fig. 5.
Fig. 6.
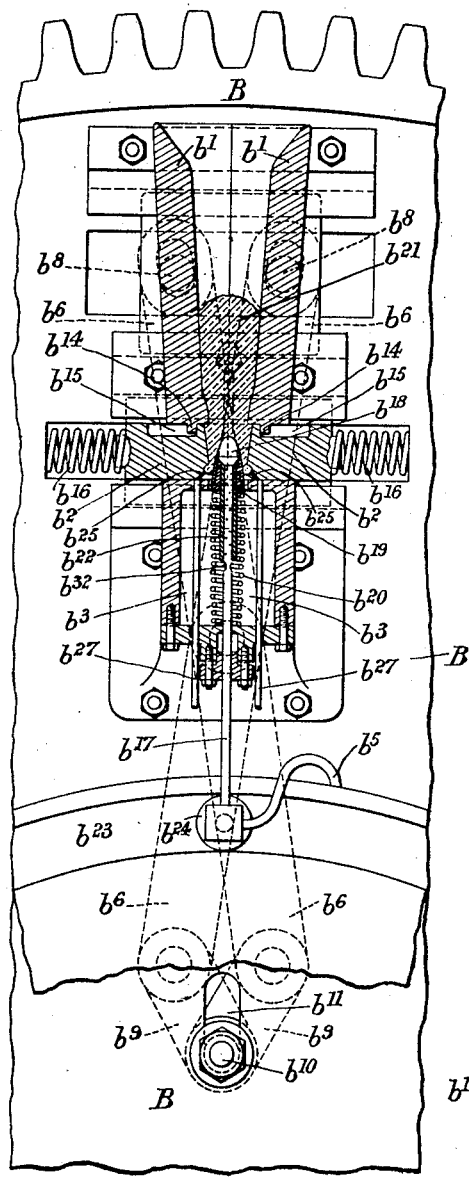
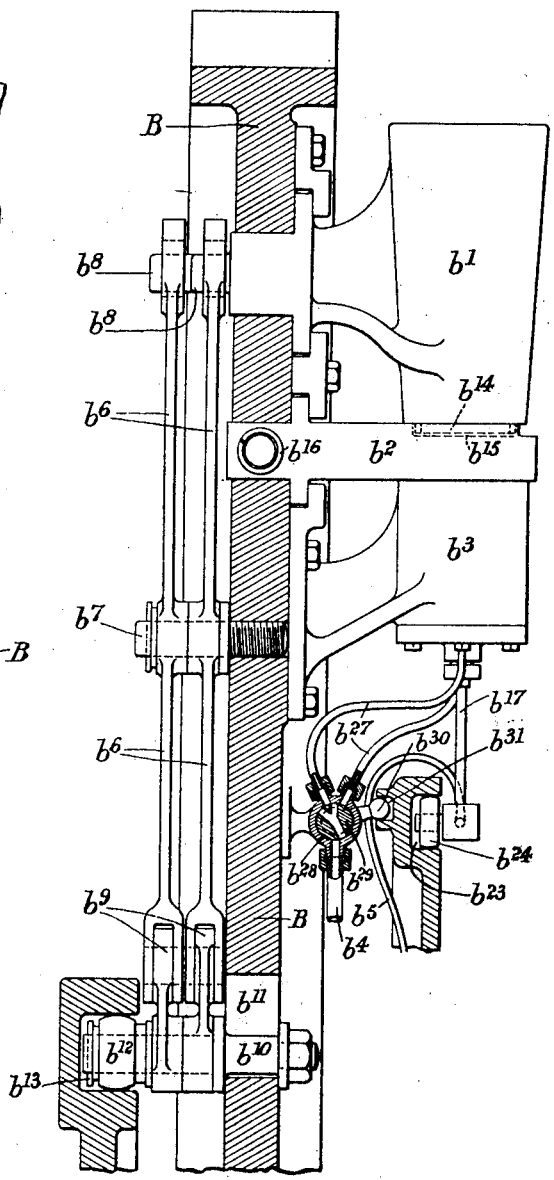
INVENTOR
Alexander Ferguson
by Houston and Houston
attys.

A. FERGUSON.
APPARATUS TO BE EMPLOYED IN THE MANUFACTURE OF HOLLOW ARTICLES OF GLASS.
APPLICATION FILED SEPT. 7, 1920.

1,371,085.

Patented Mar. 8, 1921.
5 SHEETS—SHEET 5.

INVENTOR
Alexander Ferguson
by Howson and Howson
Attys.

UNITED STATES PATENT OFFICE.

ALEXANDER FERGUSON, OF SCORRIER, ENGLAND, ASSIGNOR TO FRANCIS WILLIAM PASSMORE, OF LONDON, ENGLAND.

APPARATUS TO BE EMPLOYED IN THE MANUFACTURE OF HOLLOW ARTICLES OF GLASS.

1,371,085.     Specification of Letters Patent.     Patented Mar. 8, 1921.

Application filed September 7, 1920. Serial No. 408,624.

*To all whom it may concern:*

Be it known that I, ALEXANDER FERGUSON, a subject of the King of Great Britain, residing at Tolgullow House, Scorrier, in the county of Cornwall, England, have invented new and useful Improvements in Apparatus to be Employed in the Manufacture of Hollow Articles of Glass, of which the following is a specification.

My invention consists in improved apparatus by which hollow articles of glass can be manufactured with ease, rapidity, and economy, and in such manner that the articles produced are of very good quality.

According to my invention cylinders, or receptacles, are arranged at intervals around a rotatable wheel with their openings at the periphery of the said wheel. In each cylinder, or receptacle, is a piston, or plunger, which, by any suitable means, as the wheel rotates, will be moved inward when the open end of the cylinder, or receptacle, becomes submerged in molten glass in the forehearth, or other suitable vessel, containing molten glass, and thereby a charge of such glass is drawn into the cylinder, or receptacle. The said wheel rotates continuously, or intermittently, and the pistons, or plungers, retain the molten glass in the cylinders, or receptacles, until they come opposite a passage leading to the periphery of another rotatable wheel containing a circular series of peripheral molds in which the articles can be molded to, or partly to, the required shape and then the said pistons, or plungers, are operated to expel the contents of the cylinders, or receptacles, into the said molds.

For bottle making, for which my apparatus is especially suitable, the bottle-neck will be formed in the molds carried by the aforesaid second wheel and a third wheel, furnished with molds to form the bodies of the bottles, is mounted to rotate in proximity to the periphery of the second wheel and as these body-molds are presented to the neck-molds of the second wheel the plastic glass bottle blanks will be removed from the said neck-molds into the molds of the third wheel to be blown to bottle shape. Any suitable gear may be employed whereby the movement of the pistons in the first wheel and the supply of compressed air as required will be properly regulated.

I will more particularly describe my invention with reference to the accompanying drawings which illustrate an apparatus for making bottles.

Figure 2:
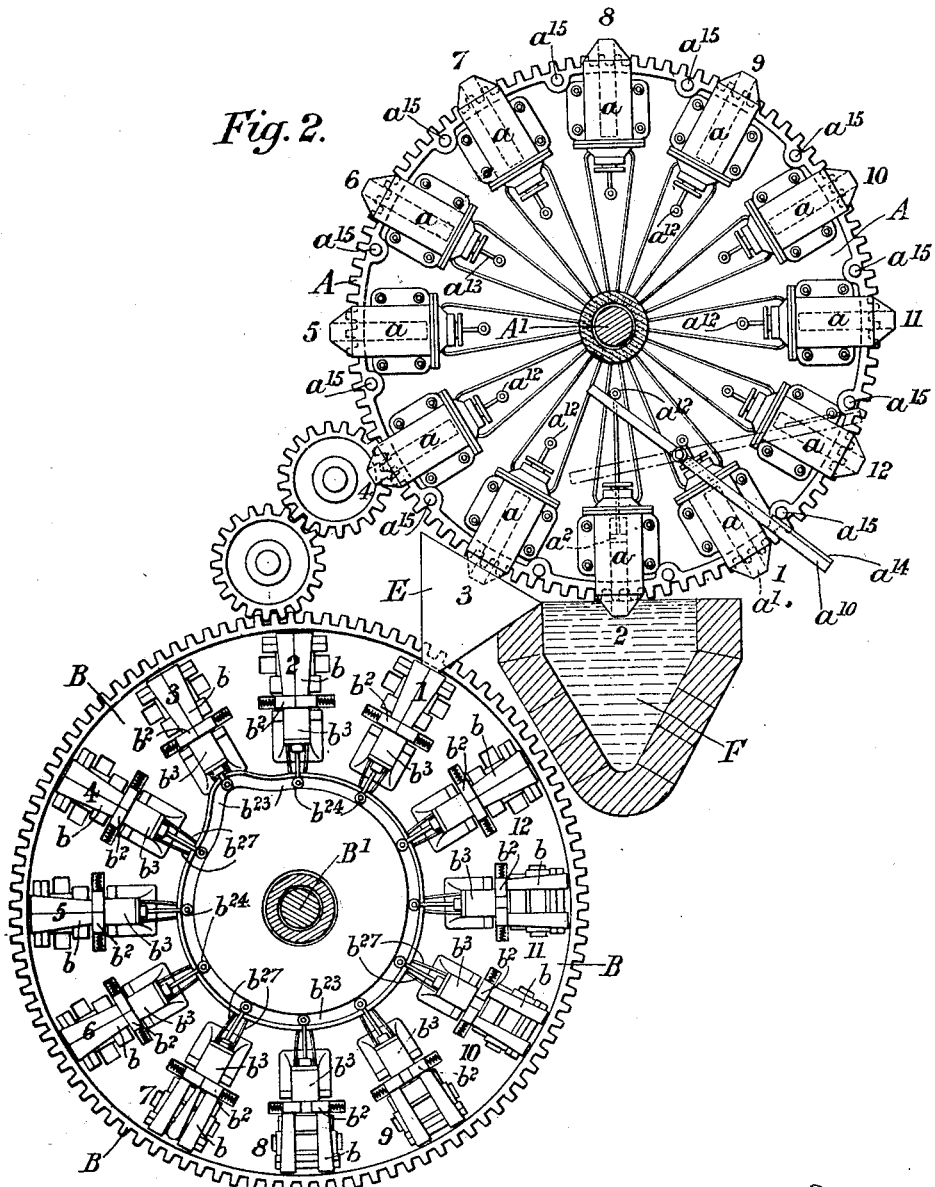
Figure 3:
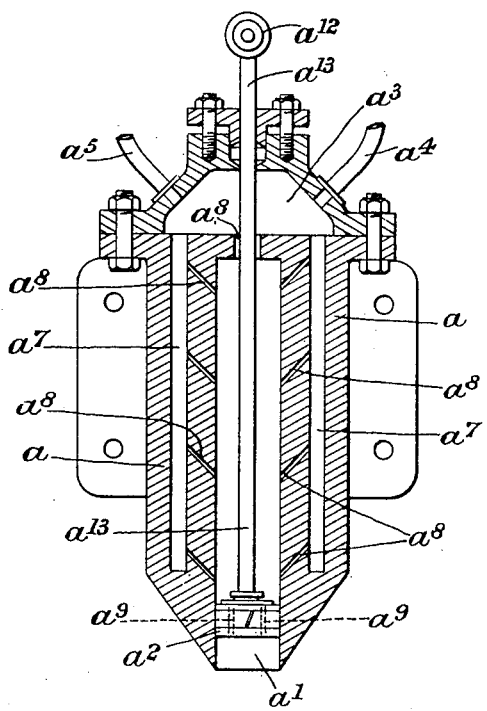
Figure 4:
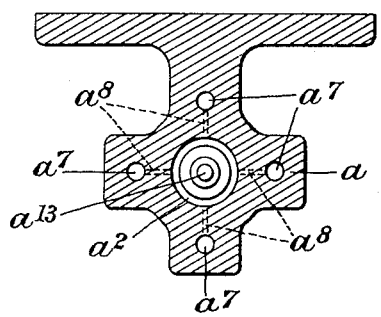

Figure 1 shows the apparatus in section; Fig. 2 shows in side section the gathering wheel, parison mold wheel, and the forehearth of the furnace. Figs. 3 and 4 are sections at right angles to each other of one of the gathering cylinders.

Figure 7:
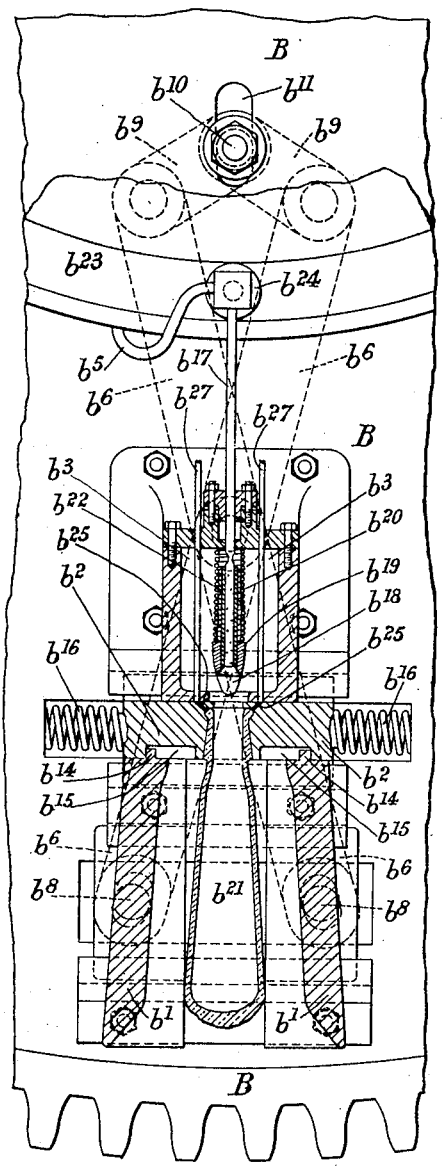
Figure 8:
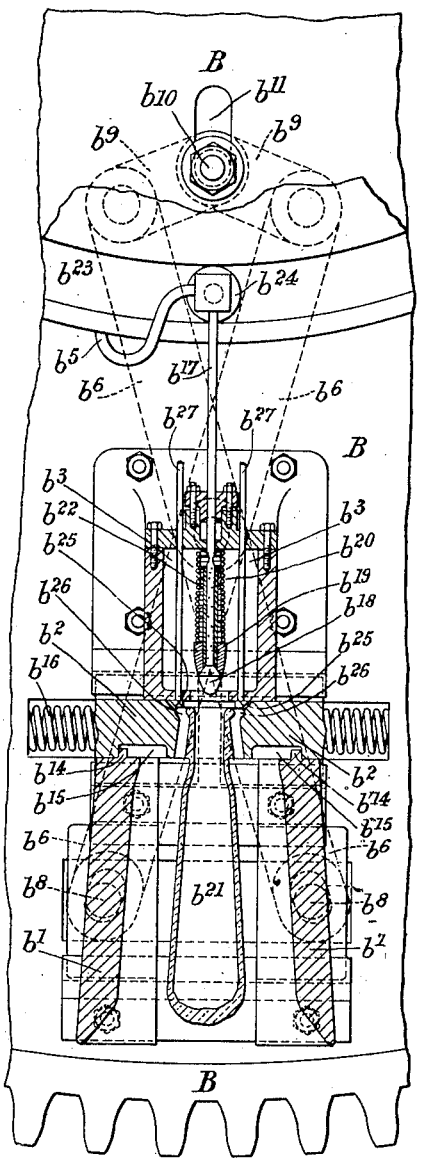

Figs. 5 and 6 are sections at right angles to each other of one of the parison molds, and Figs. 7 and 8 are similar views to Fig. 5 showing the parison molds in different positions.

The apparatus illustrated in the said drawings comprises a gathering cylinder wheel A rotatably mounted upon a stationary horizontal shaft $A^1$ parison mold wheel B rotatably mounted upon a stationary horizontal shaft $B^1$ and a shaping mold wheel C rotatably mounted on a stationary vertical shaft $C^1$. Each of the aforesaid wheels has continuous, or intermittent, rotary motion imparted thereto from any convenient source.

The shafts $A^1$ and $B^1$ have longitudinal air and suction passages formed therein each leading into a radial passage in the said shaft, arranged in the path of a series of passages formed in the hub of the rotatable wheels A and B respectively so that air and suction can be alternately conveyed by means of tubes $a^4$, $a^5$, and $b^4$, $b^5$, communicating with the passages in the hub of the said wheels to the gathering cylinders and parison molds respectively. The shaft $C^1$ has a longitudinal passage leading into a radial passage in the path of a series of passages in the hub of the horizontal wheel C so that air under pressure can be conveyed by tubes $c^4$ communicating with the aforesaid passages in the hub to a cap, or closure, of the blowing, or shaping molds, as hereinafter described.

The wheel A has secured thereto a series of open-ended gathering cylinders, for example, twelve cylinders. Each cylinder comprises a body-part $a$, (see Figs. 3 and 4) having an open-ended cylindrical part $a^1$, within which a plunger $a^2$ reciprocates. The upper portion of the said body-part is provided with a hollow cover $a^3$, to which air and suction is alternately admitted by the tubes $a^4$ and $a^5$. Air and suction passes from the hollow cover $a^3$ to the interior of the plunger cylinder $a$ through passages $a^7$ communicating with the interior of the cylinder by means of pin holes, or passages, $a^8$.

A charge of molten glass is drawn into the cylinder $a^1$, by the withdrawal of the plunger, in conjunction with suction admitted, through the aforesaid pin holes $a^8$, to the rear side of the plunger, through which it passes by pin holes $a^9$ to the other side of the said plunger and acts to assist the plunger to draw in a charge of molten glass from the fore-hearth F.

The plunger is caused to be withdrawn by a lever $a^{10}$, pivoted to the frame D, the inner end of which is caused at the proper time to engage with a roller $a^{12}$, on the end of the plunger rod $a^{13}$. As each gathering cylinder is, in succession, brought into the position No. 1 in Fig. 2, the outer end of the said lever is actuated by one of a series of pins $a^{15}$ secured to the gathering cylinder wheel so that, as the said wheel rotates, it causes the lever $a^{10}$ to turn on its fulcrum and the inner end of the lever to be raised and act upon the underside of the roller $a^{12}$, so as to withdraw the plunger $a^2$. The outer end of the lever is provided with a projecting piece $a^{14}$ with which the pin $a^{15}$ engages and slides down as the wheel A rotates until the plunger rod $a^{13}$ is at the top of its stroke, whereupon the pin $a^{15}$ is moved out of the path of the piece $a^{14}$ and the lever is free to be returned, by a counterpoise, to its normal position in readiness to be actuated by the next of the series of pins $a^{15}$ so as to withdraw the plunger of the next succeeding cylinder.

As the gathering cylinder moves from the position 2 toward the position 3, the plunger $a^2$ is caused to descend and forces the charge of molten glass into a funnel E, from which it passes into one of a series of parison molds $b$ in position to receive it.

The plunger $a^2$ may be caused to descend by the action of air under pressure, which is led through the pipe $a^5$, into the hollow cover $a^3$ whence it passes through the aforesaid passages $a^7$ and $a^8$, into the cylinder $a^1$ and forces the plunger outward, or, if desired, means may be employed for causing the plunger to descend similar to that hereinbefore described for withdrawing it, but acting in the reverse order, for example, by a lever, pivotally mounted on the other side of the wheel to which the lever $a^{10}$ is mounted, the outer end of which is, at the proper time, engaged by one of a series of pins or extensions, of the aforesaid pins $a^{15}$ passing through the aforesaid wheel A, the inner end of the said lever acting on the upper side of an anti-friction roller carried by an angular extension of the plunger rod $a^{13}$ and passing through a slot to the other side of the wheel.

The charge of molten glass passes, as aforesaid, from the gathering cylinder when in the position indicated at 3 into a parison mold $b$ in line therewith, as indicated at position 1 of wheel B. Each of the parison molds $b$, as shown more particularly in Figs. 5, 6, 7 and 8 comprises a slidable divided parison mold proper $b^1$, $b^1$, a slidable divided ring, or neck, mold $b^2$, $b^2$, and an air cylinder $b^3$ secured to the wheel B. The divided parts $b^1$, $b^1$, of the parison mold are caused to be opened, or separated, at the proper time, by means of levers $b^6$, pivoted at $b^7$ to the wheel B, one end of the said levers being connected to a pin $b^8$ provided on each part of the mold and the other end of the said levers being connected, through links $b^9$, to a pin $b^{10}$, slidable in a slot $b^{11}$ in the said wheel B, and having an antifriction roller $b^{12}$, adapted to run in a stationary cam groove $b^{13}$ so shaped as to effect the opening and closing of the said parts of the parison molds at the proper times.

The neck, or ring, mold $b^2$, is similarly divided and is caused to open, or separate, at the proper time, by the parison mold, each part of which is provided with a projection $b^{14}$ slidable in a slot $b^{15}$ in each portion of the said neck, or ring, mold. When the parison molds have opened to the desired extent, the projections $b^{14}$ engage with the wall at the end of the slot $b^{15}$ and further movement of the parison molds causes the said parts of the neck, or ring, mold to be opened, or separated, in opposition to the action of springs $b^{16}$, which act to return the parts of the neck, or ring, mold as the parts of the parison mold close.

The air cylinder $b^3$ is secured to the wheel B and has slidable therein a hollow plunger rod $b^{17}$, the inner end terminating in an enlarged neck forming head, or plunger, $b^{18}$, having inclined shoulders which permit of its easy withdrawal from the plastic glass should the said glass bulge toward the center after the head, or plunger, has been forced therethrough. The said shoulders constitute a seating for a headed plug $b^{19}$ which, under the action of a spring $b^{20}$, normally closes the mouth of the bottle being formed, and also constitutes the core of the ring, or neck, mold. The plunger rod $b^{17}$, has air under pressure supplied thereto by a tube $b^5$, connected to the hub of the wheel B as aforesaid, and the said rod is perforated at, or toward, its inner end through which perforations air passes when the plunger head $b^{18}$ is inserted in the bottle blank $b^{21}$ as indicated in dot and dash lines in Fig. 5, and blows out the blank within the parison mold, a sleeve $b^{22}$, acting to close the said perforations when the plunger rod is in the position shown in full lines in the said Fig. 5.

Air is admitted to the interior of the air cylinder $b^3$, through passages $b^{32}$ formed in the plunger rod $b^{17}$ at, or about, the end of the sleeve $b^{22}$ and passes from the said cylinder into the partially formed blank when the plunger rod $b^{17}$ is withdrawn and acts to further blow out the blank to the required form. The plunger rod $b^{17}$ is caused to reciprocate, at the proper times, by a suitably shaped stationary cam groove $b^{23}$, within which runs an antifriction roller $b^{24}$ carried on the outer end of the said plunger rod. Suction is admitted from the tube $b^4$ by branch tubes $b^{27}$, $b^{27}$, which pass through the air cylinder $b^3$ to passages $b^{25}$, $b^{25}$ leading into an annular recess $b^{26}$ (see Figs. 7 and 8) in the neck, or ring, mold $b^2$ and causes the molten glass to be drawn into the said recess so as to properly form the projecting curved ring at the entrance to the mouth of the bottle. The supply of suction is controlled by a cock $b^{28}$ (see Fig. 6) to which the tube $b^4$ and branch tubes $b^{27}$, $b^{27}$, are connected, the plug $b^{29}$, of the said cock being provided with a lever $b^{30}$, the end of which runs in a suitably shaped stationary cam groove $b^{31}$, which acts to turn the said plug, at the proper times, to put the said branch tubes into, or out of, communication with the supply tube $b^4$.

The formation of the stationary cam grooves $b^{13}$, $b^{23}$ and $b^{31}$ and also the position of the radial air supply passages in the stationary shaft $B^1$ is such that as each parison mold is, in succession, carried by the wheel B to the position 1, Fig. 2, the said mold is closed and receives a charge of molten glass from the funnel E, and suction is admitted to the passages $b^{25}$, the parts being then in the position shown in full lines in Fig. 5. When the mold arrives at the position 2, the supply of suction is cut off and the supply of air under pressure is opened to the plunger rod $b^{17}$ which with its head, or plunger $b^{18}$, has advanced somewhat into the molten glass, the air passing through the uncovered perforations in the said rod acting to blow the said glass against the walls of the neck, or ring, mold and the upper part of the parison mold and at the same time acts to force the plug $b^{19}$ against the action of the spring $b^{20}$ out of the mouth of the bottle blank. On the arrival of the closed parison mold to position 3 the head, or plunger, $b^{18}$ has advanced to its full extent into the molten glass and is thereafter retracted as the mold advances to position 4. In position 4 the plunger $b^{18}$ is fully retracted, the supply of air is cut off, and the plug $b^{19}$ still remains out of the mouth of the bottle blank. In positions 5 and 6 the parts are in the same position as in the position 4. On arrival of the mold to position 7 the said mold is half open the parts being then in the position shown in Fig. 7 of the accompanying drawings. In position 8 the mold is fully opened permitting a withdrawing fork $c^5$, appertaining to the finishing mold wheel C, to enter beneath the neck, or ring, mold $b^2$ and support the bottle blank released by the opening of the said neck, or ring, mold, which has been effected by the further opening of the parison mold during its movement from the position 7 to the position 8. The withdrawing fork is then retracted, as hereinafter described, and carries the bottle blank into an open shaping mold carried at the proper time by the wheel C to the required position to receive it. Fig. 8 of the accompanying drawings shows the positions of the parts when the mold is at, or about, mid-way between the positions 7 and 8. The position of the parts remain the same as in position 8 until the open mold is carried to a position between 11 and 12 where it commences to close so that on arrival to the position 12 it is fully closed and the plug $b^{19}$ is then caused to enter the neck, or ring, mold so that the parison mold is in readiness to receive another charge of molten glass when it reaches the position 1.

The horizontal wheel C carries the same number of shaping molds $c^6$, as there are parison molds, and each mold is divided and is adapted to be opened and closed at the proper times by lever $c^7$ connected by links $c^8$ to a pin $c^9$ having an antifriction roller $c^{10}$ running in a stationary cam groove $c^{11}$, all of which operate in a manner similar to that described with reference to the parison molds. Each mold is provided with a vertically slidable coned bottom $c^{12}$, which is caused to be withdrawn below the level of the bottle when finally shaped, so that the said bottle can be easily ejected from the shaping mold. The bottom $c^{12}$ is slidable in a hole $c^{13}$ in the wheel C and it is caused to ascend and descend at the proper times by a depending stem $c^{14}$ carrying antifriction rollers which engage with a stationary cam groove $c^{15}$. Rotatable with the wheel C is a wheel $c^{16}$ having spokes, or arms, $c^{17}$ each provided with brackets $c^{18}$, slidably carrying the before-mentioned fork $c^5$ which carries the bottle blank from the parison mold into the shaping mold. Each spoke is also provided with a standard $c^{19}$ to which is pivotally mounted a lever $c^{20}$ one end of which is connected by a pin and slot arrangement to the said fork and the other end is adapted to run in a stationary cam groove $c^{21}$ which causes the said lever to oscillate at the proper times so that the said fork is caused to advance and grasp the neck of the bottle blank, then to recede carrying the said blank from the parison mold into the shaping mold and then to further recede out of the path of a hollow cap-piece $c^{22}$ which descends onto the top of the shaping mold when closed. The hollow cap-piece is slidably mounted in a hole in the rim of the wheel $c^{16}$, and is provided with an upwardly projecting stem carrying antifriction rollers $c^{23}$ running in a stationary cam groove $c^{24}$ which causes the said cap-piece to be lowered onto, and to be raised from, the top of the closed shaping mold at the proper times. When the hollow cap-piece $c^{22}$ is in position on the shaping mold air under pressure is admitted thereto by the tube $c^4$ and passes from the said cap-piece into the neck of the bottle blank and blows, or forces, the plastic glass to the form of the interior of the shaping mold $c^6$. The air may, if desired, be directed into the neck of the blank by a hollow perforated tube carried by the said cap-piece, which, as the cap-piece descends enters the neck of the said blank. After the plastic glass has been sufficiently blown out, the air supply is, at the proper time, cut off by the rotation of the wheel C, and subsequently the cap-piece is raised off the mold $c^6$ which is thereafter opened to permit of the properly shaped bottle being ejected therefrom, which can be effected after the slidable bottom $c^{12}$ of the mold has been lowered, by the aforesaid fork $c^5$ which is again operated to advance and engage the neck of the bottle and then to further advance and carry the said bottle to, and deposit it on, a traveling band, or table, G as shown on the right hand side of Fig. 1.

Apparatus in accordance with my invention presents, besides economy, facility, and rapidity, of manufacture and the production of articles of good quality, the advantage that articles of different sizes and shapes can be made simultaneously in the same machine, by arranging various molds upon the second wheel, or upon both the second and third wheels, if the latter be used, and varying the capacity of the corresponding cylinders, or receptacles, on the first wheel to suit the different molds on the other wheel, or wheels, so that one machine can be employed to continuously make the articles of different sizes and shapes instead of having to employ two, or more, machines, one for each different kind of articles, or to stop the machine and change the molds which would be inconvenient and uneconomical.

Having now particularly described and ascertained the nature of my said invention and in what manner the same is to be performed, I declare that what I claim is:—

1. In apparatus for manufacturing glassware, a fore-hearth, or the like, to contain a supply of molten glass, a rotatable wheel mounted above said hearth, a series of receptacles arranged around said wheel and having open ends presented at the periphery of the wheel and adapted to enter the glass on said hearth, a plunger working in each receptacle, and means for operating said plungers successively in one direction to draw a charge of molten glass into each receptacle as it enters the molten glass on the forehearth, and means for successively operating said plungers in the opposite direction after the receptacles have left the molten glass to expel the charges from said receptacles, together with means for presenting successive molds to receive the expelled charges.

2. In apparatus for manufacturing glassware, a fore-hearth, or the like, to contain a supply of molten glass, a rotatable wheel mounted above said hearth, a series of receptacles arranged around said wheel and having open ends presented at the periphery of the wheel and adapted to enter the glass on said hearth, a plunger working in each receptacle, and means for operating said plunger successively in one direction to draw a charge of molten glass into each receptacle as it enters the molten glass on the forehearth, and means for successively operating said plunger in the opposite direction after the receptacles have left the molten glass to expel the charges from said receptacles, together with a second wheel, molds carried thereby and adapted to receive the molten glass expelled from the receptacles of the first wheel, said molds having their open ends presented at the periphery of said wheel, and means for operating said second wheel in synchronism with the first wheel to bring successive molds into position to receive charges of molten glass from successive receptacles on the first wheel.

3. The combination with a structure such as specified in claim 2, of a third wheel, molds carried thereby in position to come successively opposite the molds of the second wheel, and to receive the partially formed article from said molds, said third wheel being provided with means for blowing the unfinished body of molten glass received from the mold of the second wheel, substantially as described.

In testimony whereof I have signed my name to this specification in the presence of two subscribing witnesses.

ALEXANDER FERGUSON.

Witnesses:
G. F. TYOM,
EDWD. GEO. DAVIES.